United States Patent [19]

Kim

[11] Patent Number: 5,492,361
[45] Date of Patent: Feb. 20, 1996

[54] SIDE AIRBAG APPARATUS

[76] Inventor: Ki I. Kim, 255 S. Grand Ave., #2004, Los Angeles, Calif. 90012

[21] Appl. No.: 377,756

[22] Filed: Jan. 26, 1995

[51] Int. Cl.[6] .................................................. B60R 21/22
[52] U.S. Cl. ................................ 280/730.1; 280/728.1; 280/730.2
[58] Field of Search ........................ 280/728 R, 730 R, 280/730 A

[56] References Cited

U.S. PATENT DOCUMENTS

| | | | |
|---|---|---|---|
| 3,623,268 | 8/1970 | Capener | 280/730 A |
| 3,927,901 | 12/1975 | Weman | 290/730 R |
| 3,981,520 | 9/1976 | Pulling | 280/730 A |
| 5,172,770 | 12/1992 | Ishikawa et al. | 280/730 A X |
| 5,222,761 | 6/1993 | Koji et al. | 280/730 A |
| 5,290,084 | 3/1994 | Sinnhuber | 280/730 A |
| 5,348,342 | 9/1994 | Haland et al. | 280/730 A |

FOREIGN PATENT DOCUMENTS

| | | | |
|---|---|---|---|
| 4019596 | 1/1992 | Germany | 280/730 A |

*Primary Examiner*—Margaret A. Focarino
*Assistant Examiner*—Christopher Ellis
*Attorney, Agent, or Firm*—Irving Keschner

[57] ABSTRACT

Airbag apparatus mounted, in a first embodiment, in the vehicle arm rest and having the capability of deploying front and side airbags at or prior to a collision. In a second embodiment, the vehicle arm rest is furnished only with a front airbag. In a third embodiment, an airbag system is mounted to the vehicle arm rest positioned between the driver and passenger seats. In a fourth embodiment, the airbag is positioned in the bottom of the vehicle seat and in a fifth embodiment, the airbag system is mounted in the cover for the vehicle recliner mechanism.

3 Claims, 5 Drawing Sheets

SIDE AIRBAG APPARATUS

BACKGROUND OF THE INVENTION

1. Field of Invention

The present invention relates to a vehicle airbag system and, in particular, to an airbag restraining system which may be mounted in the vehicle armrest, the recliner covers or the side of the vehicle seat or between the driver and passenger seats.

2. Field of the Invention

Seat belts on both the driver and passenger sides have been installed in vehicles for many years in an attempt to reduce deaths and serious injuries resulting from collisions. More recently, airbag restraints have been installed in vehicles to provide an additional safety method. The typical airbag restrain is positioned in the steering wheel well to protect the driver and in a recess in the vehicle dashboard to protect the passenger.

In order to take into account injuries arising from side impacts, efforts have been made to install airbag restraint systems such that they protect the driver and front seat passenger from such injuries.

U.S. Pat. No. 5,277,441 to Sinnhuber discloses an airbag restrain system wherein a pair of airbags and their associated generators are positioned between the inner and outer walls of the vehicle door. In a first embodiment, the inner wall does not yield when the airbags are inflated to provide a yielding reenforcement in the transverse direction; in a second embodiment, the inner wall yields under the pressure of the deployed airbags. In a third embodiment, the generator and associated airbag are mounted in the vehicle seat support. In another variation, the patent discloses that the airbag may be positioned in an armrest of the seat in the inactivated state without setting forth any details of that configuration.

U.S. Pat. No. 5,316,336 to Hazu, et al discloses an airbag restraint system wherein the airbag is stored, in a folded state, in a space in a door or an armrest, laterally of a passenger in a vehicle cabin.

Although the Sinnhuber and Hazu, et al patents disclose various locations within the vehicle cabin for storing folded airbags, additional, less expensive and more effective locations are desired.

SUMMARY OF THE PRESENT INVENTION

The present invention provides an improved airbag apparatus which enables side and front airbags to automatically deploy in response to electronic sensors or detectors mounted on the vehicle responding to a collision. The airbags are mounted, in one embodiment, in the vehicle arm rest and are designed to deploy if a sensor generates a signal indicating a collision condition (before or at impact). Which airbag is deployed is dependent upon the sensor connections.

In a second embodiment, the airbag restraint system is mounted to the vehicle armrest positioned on the vehicle floor between the passenger and driver seats; in a third embodiment, the airbag restraint system is mounted in the bottom of the driver and/or passenger vehicle seat and in a fourth embodiment, the airbag restraint system is mounted in the cover for the seat recliner mechanism.

The present invention thus provides an improved inflatable airbag apparatus which is more effective in terms of safety than is currently available at an inexpensive cost, the front and side airbag deployment minimizing potential injuries to vehicle occupants.

BRIEF DESCRIPTION OF THE DRAWING

For a better understanding of the invention, as well as other objects and further features thereof, reference is made to the following description which is to be read in conjunction with the accompanying drawing wherein.

It should be noted that the same numerals utilized throughout the Figures identify identical components.

DESCRIPTION OF THE INVENTION

Figure 1:
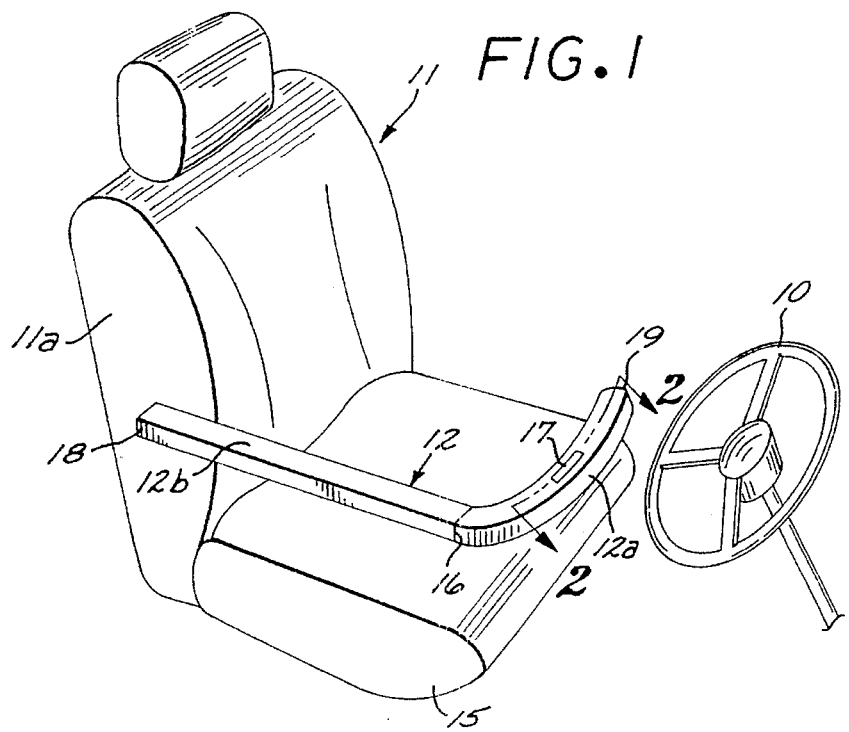
FIG. 1 is a simplified perspective view of a vehicle passenger seat having an arm rest with an airbag restraint system supported therein.
Figure 2:
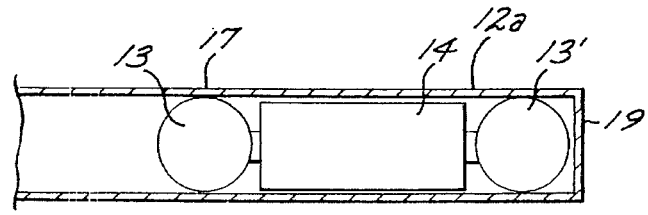
FIG. 2 is a cross-sectional view along line 2—2 of FIG. 1.
Figure 3:
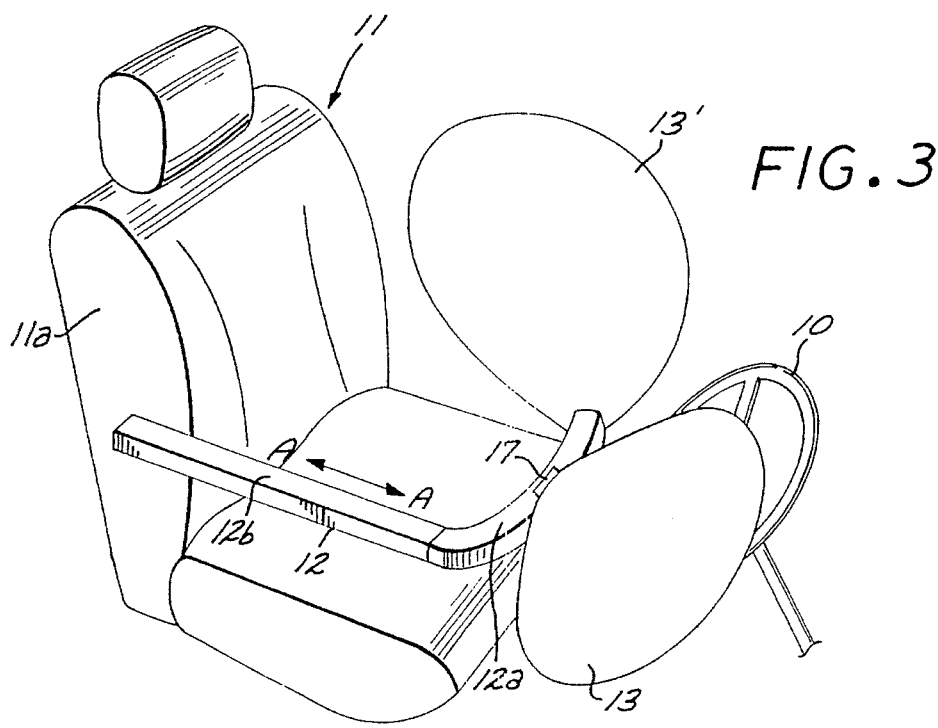
FIG. 3 is identical to FIG. 1 and illustrates the deployment of dual airbags from the arm rest.

Referring now to FIGS. 1–3, first and second embodiments of the present invention are illustrated. The simplified view of FIG. 1 illustrates the interior of a vehicle with a steering wheel 10 and driver seat 11, seat 11 comprising a rear, or back, portion 11a and a bottom seat portion 15. In accordance with the teachings of the present invention, an arm rest 12 is provided, arm rest 12 comprising rotatable front portion 12a and rear portion 12b (it should be noted that an identical arm rest can be installed in front of the vehicle passenger, if desired). Front portion 12a, a modification to a conventional arm rest, is rotatable in a vertical plane about end point 16 to allow the seat occupant to exit the vehicle. Rear portion 12b is pivotable about 18 and modified from the conventional arm rest so that the length thereof is adjustable in the direction indicated by arrows A—A and locked at the desired position. An opening 17 is formed on the top of portion 12a as illustrated.

Positioned within portion 12a is an inflator 14 comprising a gas generator, ignitor lines and an ignitor, inflator 14 being coupled to airbags 13 and 13 as illustrated. In the embodiment shown in FIG. 1, only airbag 13 is deployed through opening 17 (an actual deployment shown in FIG. 3) when a head-on collision is detected (sensors for detecting a collision and causing a gas generator to be energized are conventional and does not form a part of the present invention). In the dual deployment mode shown in FIG. 3, side airbag 13 is also deployed through an opening 19 at the end of front portion 12a as illustrated when a side collision is detected (sensors for detecting a side collision and causing a gas generator to be energized are conventional and do not form a part of the present invention). Adjustability of arm 12b enables the driver to position and lock the arm 12b close to his/her body to minimize the possibility of injury because of a collision regardless of the driver's physical size.

Figure 4:
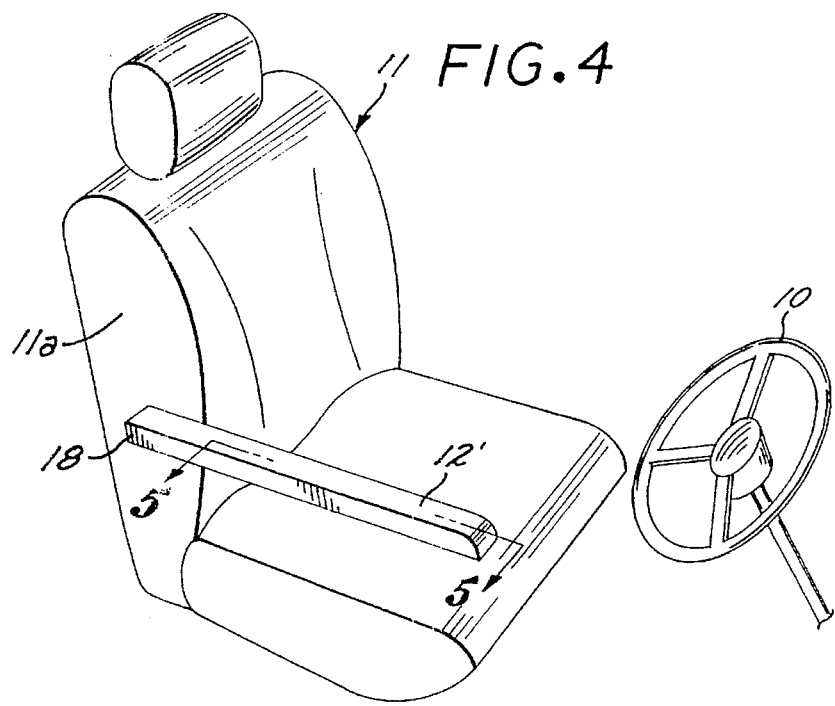
FIG. 4 is a simple perspective view illustrating a second embodiment of the invention and, in particular, the use of a vehicle arm rest for storing a single airbag restraint system.
Figure 5:
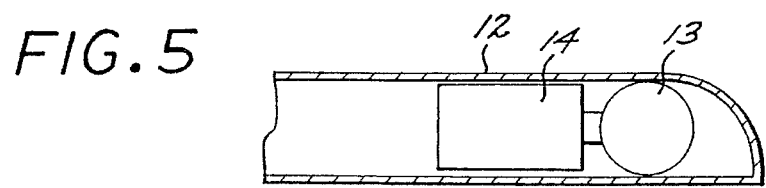
FIG. 5 is a cross-sectional view along line 5—5 of FIG. 4.
Figure 6:
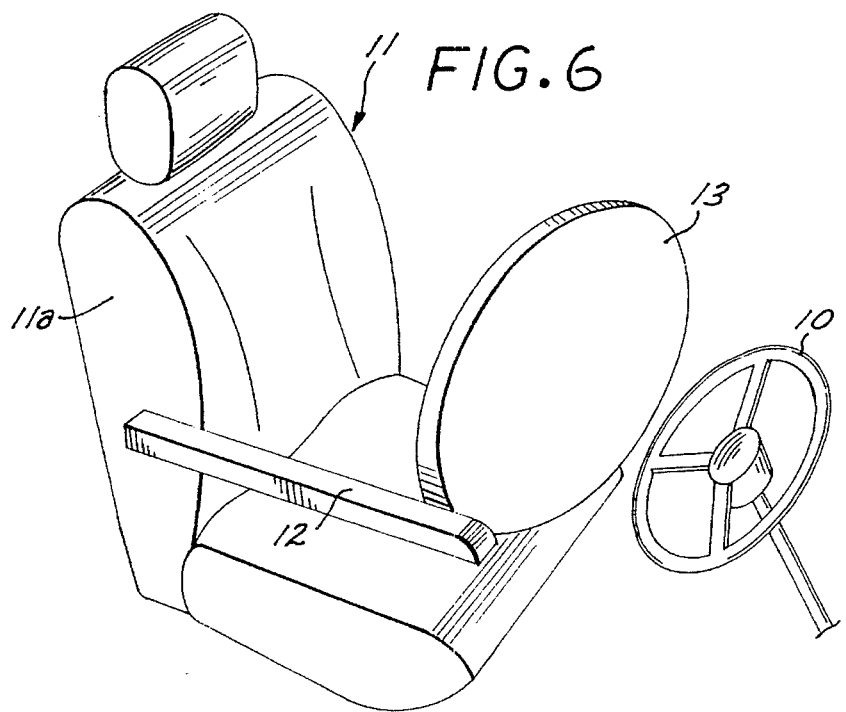
FIG. 6 is identical to FIG. 4 and illustrates the deployment of a single airbag from the vehicle arm rest.

FIGS. 4–6 illustrate a third embodiment of the invention wherein an adjustable arm rest 12 is provided without the front portion 12a of FIGS. 1–3. In addition, this embodiment is limited to the deployment of a single airbag 13 as shown in FIG. 6. In this case, airbag 13 is deployed through an opening (not shown) in the side of arm rest 12 as illustrated.

Figure 7:
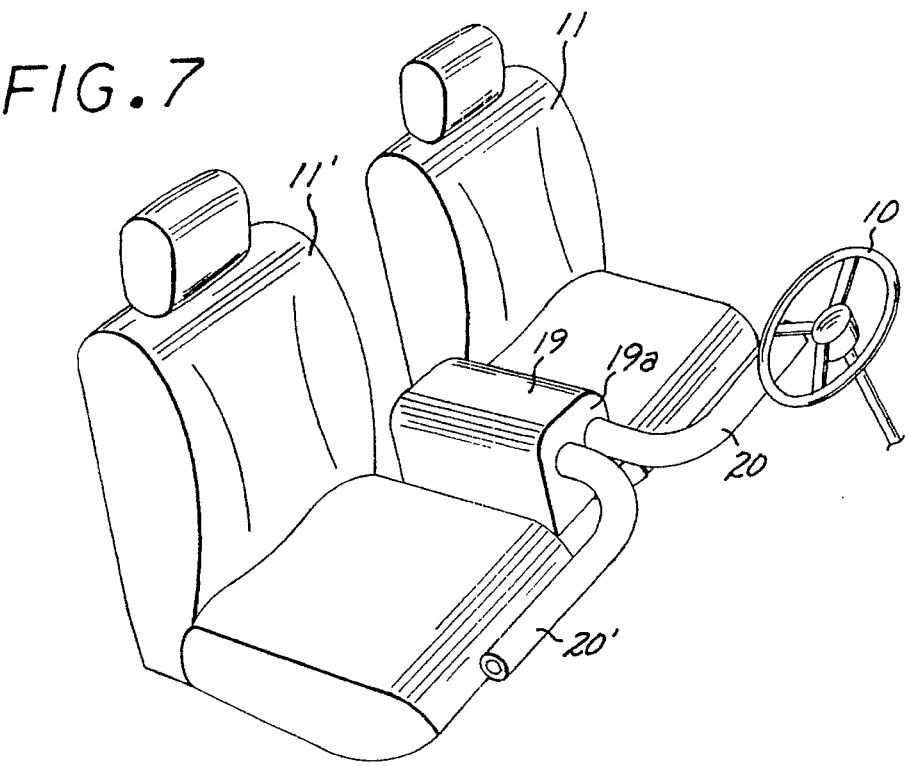
FIG. 7 is a simplified perspective view of a third embodiment of the present invention.
Figure 8:
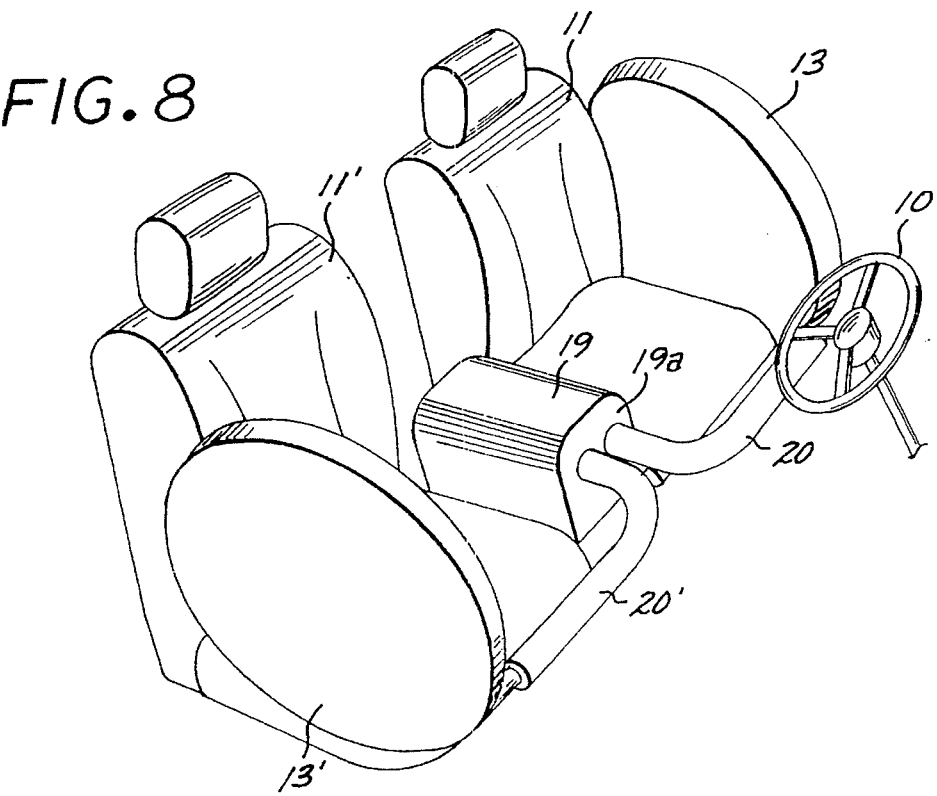
FIG. 8 is identical to FIG. 7 and illustrates the deployment of driver and passenger side airbags.

FIGS. 7 and 8 illustrate a fourth embodiment of the present invention wherein an arm rest 19 is mounted to the floor of the vehicle, tubular arms 20 and 20 extending from the front face 19a of base unit 19 towards the driver and passenger sides, respectively. Both arms 20 and 20 are adjustable up to 90 degrees, the horizontal length thereof being adjusted by a spring (not shown). The inflator mechanism for deploying side airbags 13 and 13' are identical to that utilized in the arm rest airbag systems described hereinabove and are incorporated in arms 20 and 20'.

Figure 9:
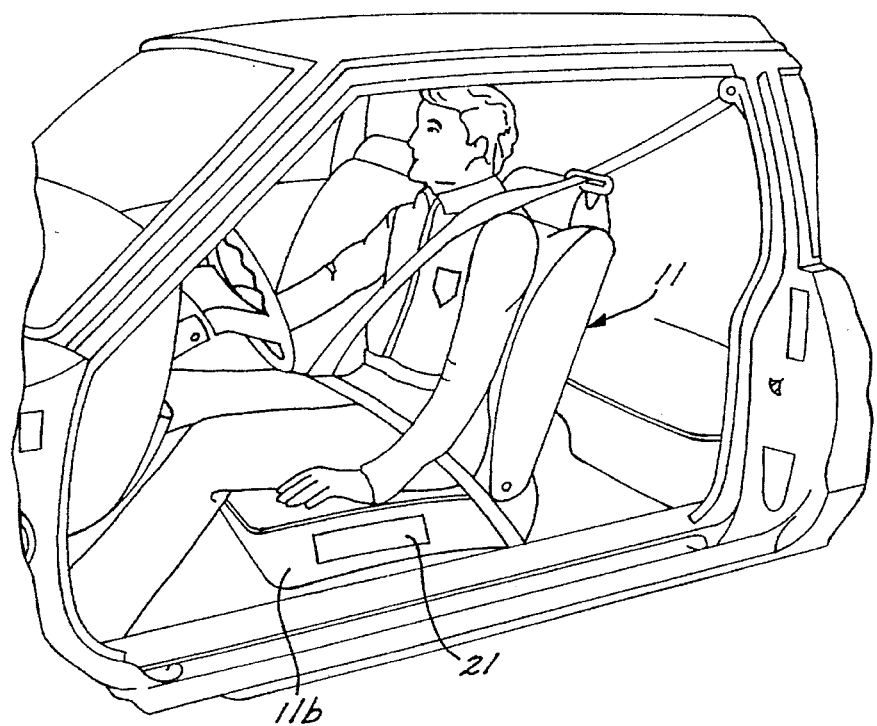
FIG. 9 is a simplified perspective view of a fourth embodiment of the present invention.
Figure 10:
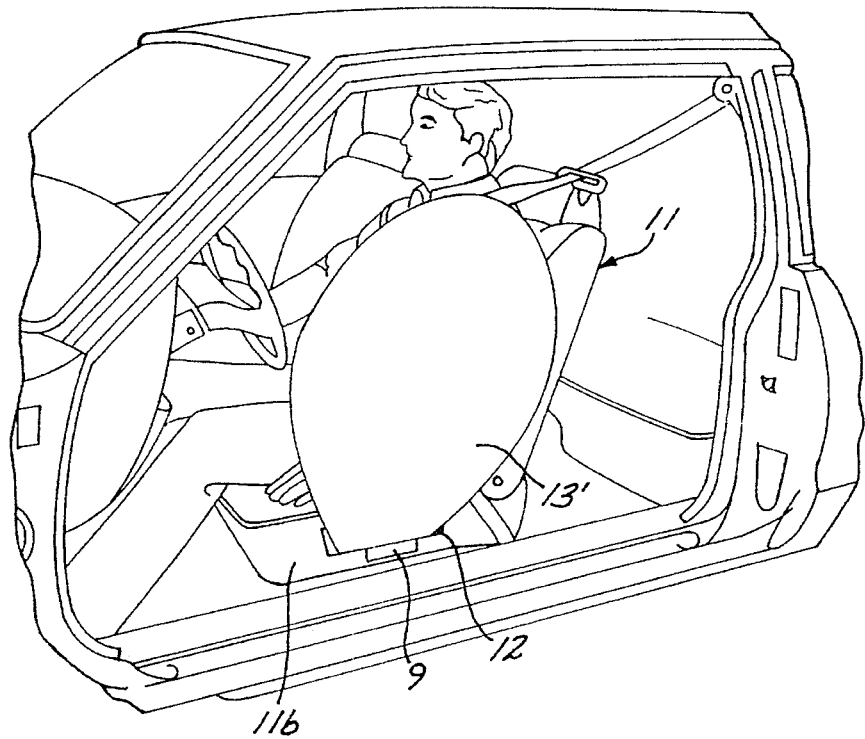
FIG. 10 is identical to FIG. 9 and illustrates the deployment of a side airbag from the bottom of the driver seat.

FIGS. 9 and 10 illustrate a fifth embodiment of the present invention wherein the side airbag 13 and inflator mechanism 14 are stored in the bottom of the driver seat 11b, or, if desired, in the bottom of the passenger seat. When a sensor detects a side collision, airbag 13, is deployed through an opening 21 formed in the bottom of seat 11b as illustrated.

Figure 11:
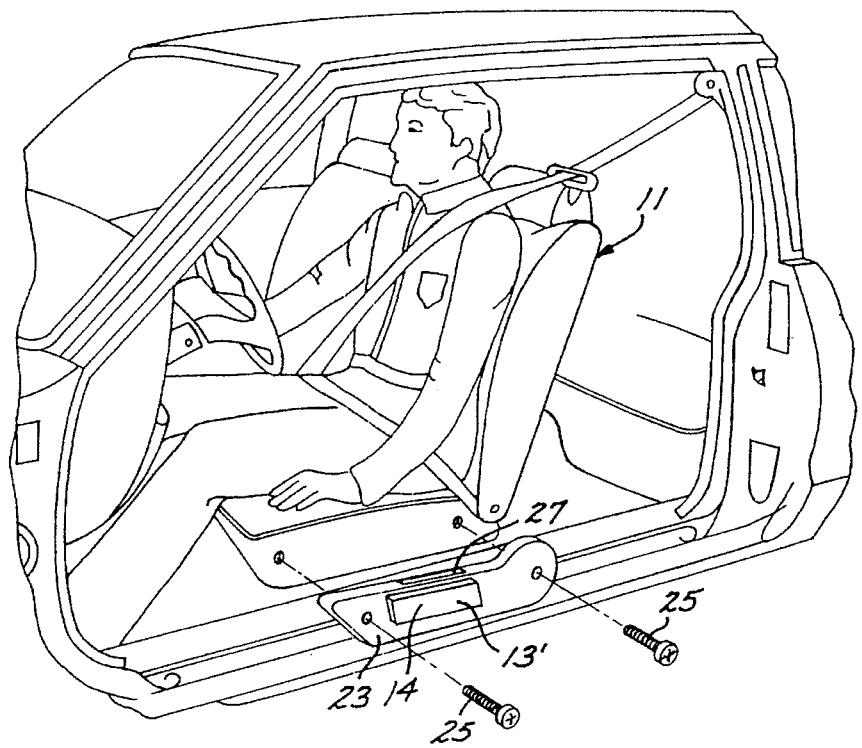
FIG. 11 is a simple perspective view of a fifth embodiment of the present invention.
Figure 12:
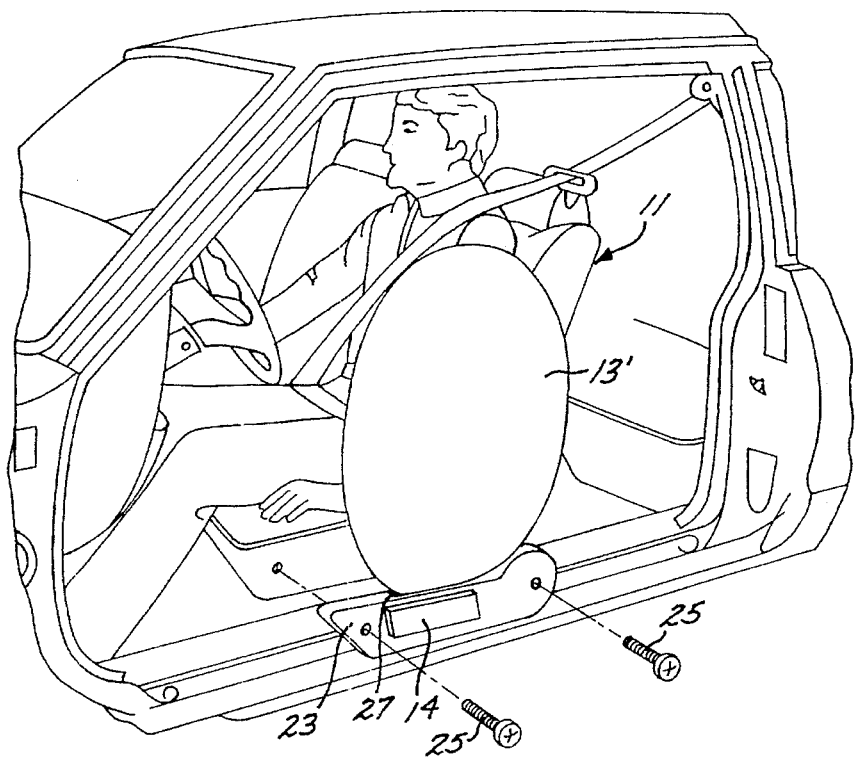
FIG. 12 is identical to FIG. 11 and illustrates the deployment of a side airbag from the cover for the recliner mechanism.

FIGS. 11 and 12 illustrate a sixth embodiment of the present invention wherein the side airbag 13' and inflator mechanism 14 are mounted in the plastic member 23 which covers the front seat recliner mechanism. Two screws 25 are utilized to secure member 23 in position over the recliner mechanism. As shown in FIG. 12, airbag 13' is deployed through an opening 27 formed in the top of member 23 as illustrated when a sensor detects a side collision. Mounting the airbag and inflator mechanism in cover member 23 enables each component to be quickly and easily repaired or replaced which in turn reduces repair and replacement costs. The side airbag, when deployed, extends from below the thigh area of the driver towards the shoulder area as shown in FIG. 12. Locating the airbag in the recliner cover thus provides more coverage (and thus protection) to the driver than currently available side airbags which typically deploy in a manner that only protects the upper body portion of the driver or passenger.

It should be noted that the deployment of the airbags in the embodiments described hereinabove are dependent upon the sensor connections. For example, the sensors can be connected in a manner such that a side collision will cause the deployment of front and side airbags at the same time. Further, although various embodiments illustrate the use of the airbag restraints adjacent the driver seat, it should be noted the airbag restrain can also be used in conjunction with the passenger seat.

The present invention thus provides a number of vehicle structural arrangements wherein a side airbag can be easily stored and rapidly deployed in a manner which is less costly than systems currently available.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An airbag equipped restraint for a motor vehicle occupant, the motor vehicle having at least one seat for the occupant, said vehicle seat having bottom and back portions comprising:

a stationary arm rest having first and second portions, said first portion extending from said back seat portion in a first direction, said second portion being coupled to said first portion and extending substantially perpendicular therefrom in a manner such that said second portion is in front of said occupant, an opening formed in said second portion of said arm rest; and a first airbag and gas generator means positioned in said second portion of said arm rest, detection of a collision by sensor means activating said gas means whereby said first airbag expands upwardly through said opening in said arm rest in front of said occupant when inflated by gas from the gas generator means.

2. The restraint of claim 1 further including a second airbag positioned in said second portion of said arm rest, detection of a collision by said sensor means activating said gas means whereby said second airbag expands upwardly through a second opening in said second portion of said arm rest adjacent the side of said occupant when inflated by gas from the gas generator means.

3. An airbag equipped restraint for a motor vehicle occupant, the motor vehicle having at least two seats, one for the driver and one for a passenger, said vehicle seats having bottom and back portions comprising;

an arm rest positioned on the vehicle floor between said driver and passenger seats and having first and second arm members, said first arm member extending from the front of said arm rest to said passenger seat such that a portion of said first arm member is positioned in front of said passenger, said second arm member extending from the front of said arm rest to said driver seat such that a portion of said second arm member is positioned in front of said driver, openings being formed in said first and second arm members; and first and second airbags and gas generator means positioned in first and second arm members, respectively, detection of a collision by sensor means activating said gas means whereby said first and second airbags expand upwardly through said openings when inflated by gas from the gas generator means in front of said passenger and driver, respectively.

* * * * *